US010821684B2

(12) United States Patent
Takagi et al.

(10) Patent No.: US 10,821,684 B2
(45) Date of Patent: Nov. 3, 2020

(54) METHOD OF PRODUCING FIBER REINFORCED PLASTIC MOLDED ARTICLE

(71) Applicant: KAWASAKI JUKOGYO KABUSHIKI KAISHA, Kobe-shi, Hyogo (JP)

(72) Inventors: Takeshi Takagi, Kakogawa (JP); Takahiro Ichinose, Kobe (JP); Osamu Hisamatsu, Akashi (JP); Yoshimitsu Takasugi, Kobe (JP); Shota Kida, Nishinomiya (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 17 days.

(21) Appl. No.: 16/329,973

(22) PCT Filed: Sep. 4, 2017

(86) PCT No.: PCT/JP2017/031733
§ 371 (c)(1),
(2) Date: Mar. 1, 2019

(87) PCT Pub. No.: WO2018/047761
PCT Pub. Date: Mar. 15, 2018

(65) Prior Publication Data
US 2019/0202146 A1    Jul. 4, 2019

(30) Foreign Application Priority Data

Sep. 12, 2016 (JP) .................................. 2016-177622

(51) Int. Cl.
*B29C 70/48* (2006.01)
*B29C 39/10* (2006.01)
(Continued)

(52) U.S. Cl.
CPC .............. *B29C 70/48* (2013.01); *B29C 39/10* (2013.01); *B29C 70/12* (2013.01); *B29C 70/548* (2013.01)

(58) Field of Classification Search
CPC ......... B29C 70/48; B29C 39/10; B29C 70/12; B29C 70/443; B29C 70/548; B29K 2063/00; B29K 2709/08
See application file for complete search history.

(56) References Cited

U.S. PATENT DOCUMENTS

2006/0216490 A1    9/2006  Ishii et al.
2011/0169190 A1*   7/2011  Miller ................... B29C 70/443
                                                                264/257
2016/0288394 A1*  10/2016  Guha .................. B29C 45/0005

FOREIGN PATENT DOCUMENTS

JP    S56-127426 A    10/1981
JP    S56-127427 A    10/1981
(Continued)

*Primary Examiner* — Joseph S Del Sole
*Assistant Examiner* — Jerzi H Moreno Hernandez
(74) *Attorney, Agent, or Firm* — Oliff PLC (57) ABSTRACT

A method of producing an FRP molded article, the method being suitable for producing a thick FRP molded article, includes: placing a reinforced fiber base material in a cavity of a forming mold, such that a direction in which fiber sheets are laminated together (a sheet lamination direction) is a horizontal direction; impregnating a resin into the reinforced fiber base material by injecting the resin into the cavity in an anti-gravitational direction from an injection port provided below the reinforced fiber base material placed in the cavity; applying pressure in the sheet lamination direction to the reinforced fiber base material impregnated with the resin; and curing the resin impregnated in the reinforced fiber base material.

2 Claims, 4 Drawing Sheets

(51) Int. Cl.
*B29C 70/12* (2006.01)
*B29C 70/54* (2006.01)

(56) References Cited

FOREIGN PATENT DOCUMENTS

| | | |
|---|---|---|
| JP | 2002-307463 A | 10/2002 |
| JP | 2006-213059 A | 8/2006 |
| JP | 2010-264944 A | 11/2010 |
| JP | 2014-205300 A | 10/2014 |

* cited by examiner

METHOD OF PRODUCING FIBER REINFORCED PLASTIC MOLDED ARTICLE

TECHNICAL FIELD

The present invention relates to a method of producing a fiber reinforced plastic (hereinafter, "FRP") molded article.

BACKGROUND ART

In recent years, lightness in weight and other characteristics of FRP have been drawing attention, and replacement of conventional metal components by FRP components is progressing. Particularly in the case of large-sized/thick components, if such metal components are replaced by FRP components, a great weight reduction effect is obtained. It should be noted that, in the description herein, an FRP molded article whose reinforced fiber base material has a thickness, in its lamination direction, of roughly greater than 100 mm is referred to as a "thick FRP molded article".

One of the existing FRP molding methods is RTM (Resin Transfer Molding) technique. In the RTM technique, a reinforced fiber base material is placed in a cavity of a forming mold; a liquid matrix resin is injected into the cavity; and the resin is cured. In the RTM technique, FRP made of the reinforced fiber and the resin can be molded while impregnating the resin into the reinforced fiber base material. Patent Literature 1 discloses a method of molding FRP by such RTM technique.

CITATION LIST

Patent Literature

PTL 1: Japanese Laid-Open Patent Application Publication No. 2006-213059

SUMMARY OF INVENTION

Technical Problem

Generally speaking, a laminated body of fiber sheets is used as a reinforced fiber base material of an FRP molded article. In each fiber sheet, fiber bundles are paralleled or weaved together. In such a reinforced fiber base material, there exist resin penetration paths, such as submicrometer gaps between the fibers and micrometer interlaminar gaps between the fiber sheets (or micrometer gaps between the fiber sheets and the mold). Since these penetration paths are very small and irregular in size, it is difficult for the resin to uniformly penetrate into the reinforced fiber base material.

Particularly in the case of obtaining a thick FRP molded article by the RTM technique, since the reinforced fiber base material is formed by a large number of laminated fiber sheets, factors that can be ignored when forming a thin FRP molded article, such as disturbance in the arrangement of the fiber sheets, make it harder for the resin to uniformly penetrate into the reinforced fiber base material. Disturbance in the arrangement of the fiber sheets is undesirable since it causes degradation in the performance of the FRP molded article.

Patent Literature 1 describes that, in the RTM technique, in order to uniformly impregnate the resin into the reinforced fiber base material, the following measures are taken: before the resin injection, the reinforced fiber base material is pressed by a mold to make the volume fraction of fiber (Vf: the proportion of the fiber volume to the entire volume) less than 60%; the resin injection pressure is increased gradually; and the orientation of the fiber sheets is adjusted so as not to be perpendicular to the flow of the injected resin.

However, it is inferred that the method disclosed in Patent Literature 1 is not intended for forming a thick FRP molded article, because if the method of Patent Literature 1 is used to form a thick FRP molded article, there is a risk that gaps between the fiber sheets are narrowed due to the pressing, which causes excessive increase in the flow resistance of the resin. If the flow resistance of the resin increases, the viscosity of the resin increases in accordance with increase in the resin injection time. This may consequently cause imperfect penetration. Moreover, in the case of adopting the method disclosed in Patent Literature 1, at the start of resin injection and when the injection pressure is gradually increased, disturbance in the arrangement of the resin sheets, such as widening of interlaminar gaps between the resin sheets, may occur.

The present invention has been made in view of the above, and an object of the present invention is to provide a method of producing an FRP molded article by using RTM technique, the method being suitable for producing a thick FRP molded article whose reinforced fiber base material is uniformly impregnated with a resin.

Solution to Problem

A method of producing a fiber reinforced plastic molded article according to one aspect of the present invention includes: placing a reinforced fiber base material made of a plurality of fiber sheets laminated together in a cavity of a forming mold, such that a sheet lamination direction is a horizontal direction, the sheet lamination direction being a direction in which the plurality of fiber sheets are laminated together; impregnating a resin into the reinforced fiber base material by injecting the resin into the cavity in an anti-gravitational direction from an injection port provided below the reinforced fiber base material placed in the cavity; applying pressure in the sheet lamination direction to the reinforced fiber base material impregnated with the resin; and curing the resin impregnated in the reinforced fiber base material.

According to the above-described method of producing a fiber reinforced plastic molded article, the sheet lamination direction of the reinforced fiber base material is the horizontal direction, and the injection direction of the resin is the anti-gravitational direction. For these reasons, the penetration of the resin into the reinforced fiber base material is facilitated, and the liquid surface of the penetrating resin is evened out. Therefore, uniform impregnation of the resin into the reinforced fiber base material is facilitated. Meanwhile, there is a concern about widening of interlaminar gaps between the fiber sheets and disturbance in the arrangement of the fiber sheets. In this respect, according to the above-described producing method, the reinforced fiber base material impregnated with the resin is compressed in the sheet lamination direction, and the resin is cured in such a state. This makes it possible to suppress disturbance in the arrangement of the fiber sheets and widening of the interlaminar gaps between the fiber sheets.

In impregnating the resin into the reinforced fiber base material, a plurality of the injection ports may be arranged such that the injection ports are scattered in the sheet lamination direction. During an initial period at a start of injection of the resin into the cavity, an amount of the resin injected from the injection ports provided below both end portions of the reinforced fiber base material in the sheet lamination direction may be set to be greater than an amount of the resin injected from the injection port, or the injection ports, provided below a central portion of the reinforced fiber base material in the sheet lamination direction, such that a liquid surface level of the resin penetrating into the reinforced fiber base material is higher at both the end portions of the reinforced fiber base material in the sheet lamination direction than at the central portion of the reinforced fiber base material in the sheet lamination direction, and thereafter, an injection amount of the resin may be changed at, at least, one of the injection ports such that the liquid surface level of the resin is evened out.

In impregnating the resin into the reinforced fiber base material, a plurality of the injection ports may be arranged such that the injection ports are scattered in the sheet lamination direction, and among the plurality of the injection ports, after injection of the resin from the injection ports provided below both end portions of the reinforced fiber base material in the sheet lamination direction has been started, injection of the resin from the remaining injection port or the remaining injection ports may be started.

By operating the plurality of the injection ports in the above-described manner, during the initial period at the start of the injection of the resin into the cavity, the liquid surface level of the resin penetrating into the reinforced fiber base material is made higher at both the end portions of the reinforced fiber base material in the sheet lamination direction than at the central portion of the reinforced fiber base material in the sheet lamination direction. Consequently, disturbance in the arrangement of the fiber sheets and widening of the interlaminar gaps between the fiber sheets due to the resin injection into the cavity can be further suppressed.

Advantageous Effects of Invention

The present invention makes it possible to provide a method of producing an FRP molded article, the method being suitable for producing a thick FRP molded article whose reinforced fiber base material is uniformly impregnated with a resin.

DESCRIPTION OF EMBODIMENTS

Next, one embodiment of the present invention is described with reference to the drawings.

[Configuration of FRP Molded Article]

An FRP molded article produced by an FRP molded article producing method according to the embodiment of the present invention is made of: a reinforced fiber base material (a preform); and a resin (matrix) impregnated and cured in the reinforced fiber base material. The FRP molded article producing method is suitable for producing a "thick" FRP molded article having a thickness of roughly greater than 100 mm (the thickness is the dimension of the FRP molded article in its sheet lamination direction; the sheet lamination direction will be described below). Examples of the thick FRP molded article include an aircraft blade, an aircraft fuselage component, a plate spring component of a railcar bogie, and a blade of a wind power generator. However, the range of application of the FRP molded article producing method is not limited to such thick FRP molded articles. The FRP molded article producing method is also applicable to the production of an FRP molded article having a less thickness than these thick FRP molded articles.

The reinforced fiber base material is obtained by laminating a plurality of fiber sheets together in their thickness direction. Hereinafter, the direction in which the plurality of fiber sheets are laminated together is referred to as "sheet lamination direction". In the reinforced fiber base material, core members may be disposed between the plurality of laminated fiber sheets. In the present embodiment, the plurality of laminated fiber sheets are put together by simply adhering or suturing them together, which is then used as the reinforced fiber base material. The reinforced fiber is not limited to a particular kind of fiber. Various kinds of fibers used in conventional FRP, such as carbon fiber, glass fiber, and aramid fiber, are usable as the reinforced fiber. The form of each fiber sheet is also not particularly limited. A fabric such as a plain-weave fabric, a twill-weave fabric, or a satin-weave fabric, unidirectional or multidirectional fibers that are put together by stitch yarn, a knitted material, etc., are usable as the fiber sheet.

The above resin may be a liquid resin having fluidity at a predetermined temperature (e.g., 60° C.). Specific examples of the resin include thermosetting resins, such as epoxy resin, unsaturated polyester resin, vinyl ester resin, phenolic resin, and bismaleimide resin.

[FRP Molded Article Producing Method]

Figure 1:
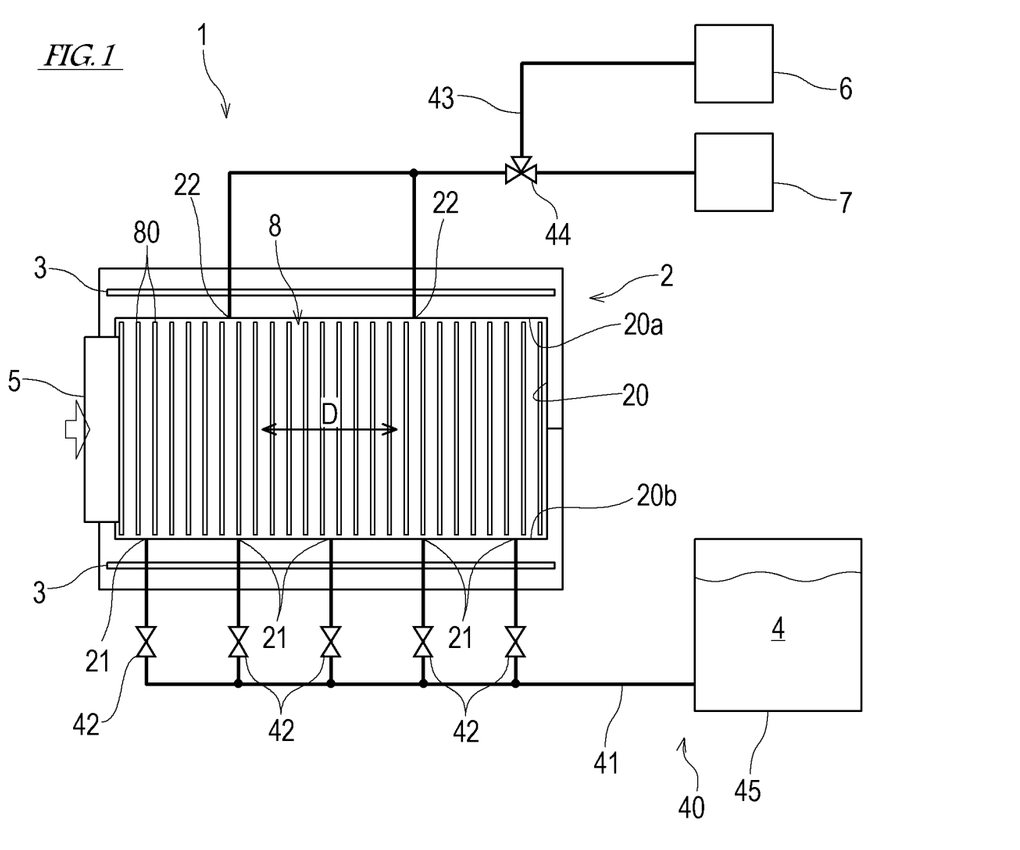
FIG. 1 is a schematic diagram of a molding apparatus used in an FRP molded article producing method according to one embodiment of the present invention.

FIG. 1 is a schematic diagram of a molding apparatus 1 used in the FRP molded article producing method according to the embodiment of the present invention. FIG. 1 shows a vertical section parallel to a sheet lamination direction D of a forming mold 2 at the time of injecting a resin 4 into a cavity 20 of the forming mold 2.

The FRP molded article producing method according to the present embodiment uses the molding apparatus 1 illustratively shown in FIG. 1. The molding apparatus 1 includes: the forming mold 2: an unshown mold clamping device (e.g., a pressing device) configured to clamp the forming mold 2; an injector 40; a heater 3; an exhauster 6; and an air supply device 7.

The forming mold 2 is made up of an upper mold and a lower mold. The upper and lower molds are provided with cavity forming portions 20a and 20b, respectively. When the upper and lower molds are clamped together, both the cavity forming portions 20a and 20b are put together, and thereby the cavity 20 is formed.

The cavity forming portion 20b of the forming mold 2 is provided with a plurality of injection ports 21. Each injection port 21 is open upward in the bottom of the cavity forming portion 20b to allow the resin 4 to be injected from the bottom of the cavity 20 in the anti-gravitational direction. It should be noted that the resin injection direction from each injection port 21 is not strictly limited to the anti-gravitational direction, but may be tilted to some extent from the anti-gravitational direction (about ±10°). The plurality of injection ports 21 are arranged such that the injection ports 21 are scattered in the sheet lamination direction D of a reinforced fiber base material 8 placed in the cavity 20.

Each injection port 21 is connected to the injector 40. The injector 40 includes: a container 45, in which the resin 4 in a liquid state is stored; a supply pipe 41 connecting the container 45 and the injection ports 21; and open/close devices 42 configured to switch the state of the injection ports 21 between open and closed. The open/close devices 42 may be, for example, valves provided on the supply pipe 41. In FIG. 1, each of the open/close devices 42 is provided for a corresponding one of the injection ports 21. However, as an alternative, each open/close device 42 may be provided for a corresponding combination of injection ports 21, and the injection ports 21 of the combination may be opened/closed concurrently.

The cavity forming portion 20a of the forming mold 2 is provided with a plurality of discharge ports 22. Similar to the injection ports 21, desirably, the plurality of discharge ports 22 are arranged such that the discharge ports 22 are scattered in the sheet lamination direction D of the reinforced fiber base material 8 placed in the cavity 20. Each discharge port 22 is open in the ceiling of the cavity forming portion 20a so that gas can be discharged from the top of the cavity 20. Each discharge port 22 is connected to the exhauster 6 and the air supply device 7 via an exhaust gas pipe 43. The state of each discharge port 22 can be switched to a state of being connected to the exhauster 6, a state of being connected to the air supply device 7, and a closed state. The switching is performed by a switching device 44. The switching device 44 may be formed by, for example, one or a plurality of valves provided on the exhaust gas pipe 43.

The forming mold 2 is provided with the heater 3 configured to heat the resin 4 filling the cavity 20. The heater 3 may have a known configuration that includes, for example: a heating medium passage formed in the forming mold 2; a heating device configured to heat a heating medium flowing through the heating medium passage; a heating wire; and a power supply device configured to supply electric power to the heating wire.

The forming mold 2 is provided with a pressing device 5 configured to apply pressure in the sheet lamination direction D to the reinforced fiber base material 8 placed in the cavity 20 (including the reinforced fiber base material 8 impregnated with the resin 4). As a result of the reinforced fiber base material 8 being pressed by the pressing device 5 in the sheet lamination direction D, pressure is applied to the reinforced fiber base material 8, which is sandwiched between the pressing device 5 and the forming mold 2, from both sides in the sheet lamination direction D. It should be noted that, for example, the pressing device 5 may be formed by: a pusher exposed in the cavity 20; and an actuator configured to move the pusher forward and backward in the horizontal direction.

Figure 2:
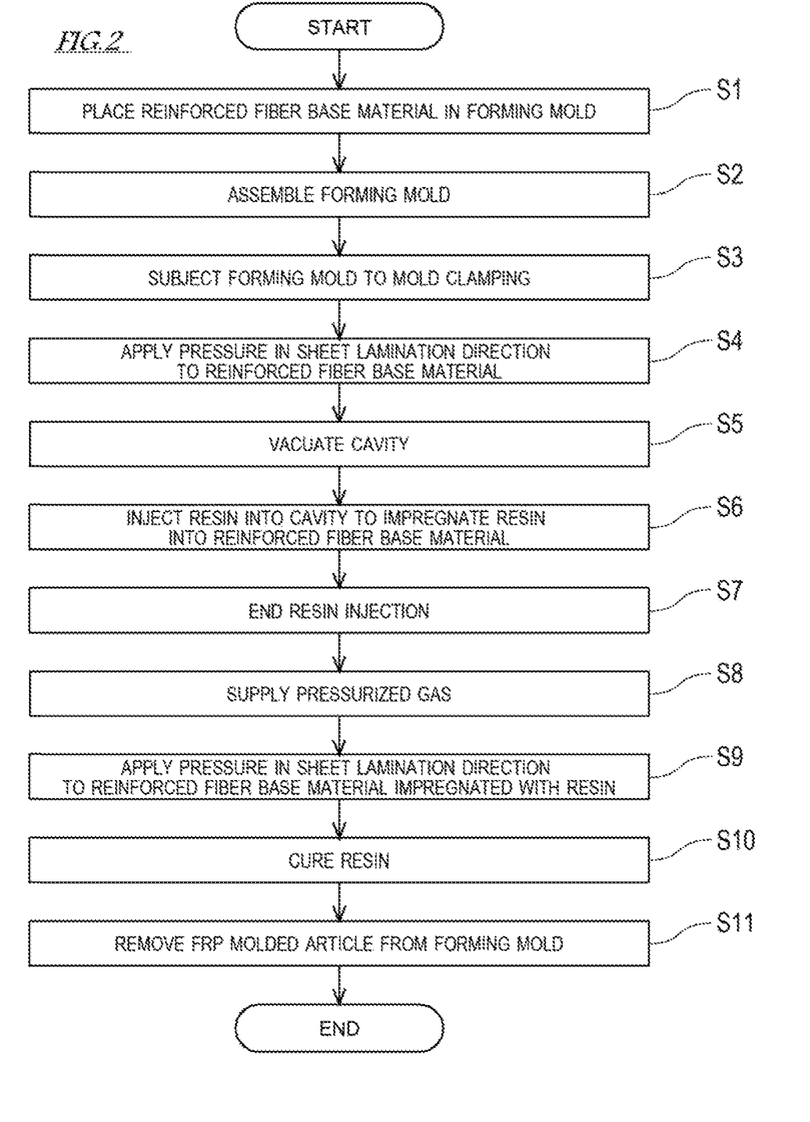
FIG. 2 shows a flow of the FRP molded article producing method.

Hereinafter, the flow of the FRP molded article producing method is described in detail with reference to FIG. 2. FIG. 2 is a flowchart of the FRP molded article producing method. First, the reinforced fiber base material 8 is placed in the forming mold 2 (step S1). Here, the reinforced fiber base material 8 is placed in the cavity forming portion 20b of the forming mold 2, such that the sheet lamination direction D is the horizontal direction. A plurality of fiber sheets 80 stacked and put together in their thickness direction may be prepared in advance and used as the reinforced fiber base material 8. In this manner, work efficiency can be improved. Alternatively, the plurality of fiber sheets 80 may be arranged in the cavity forming portion 20b of the forming mold 2 such that the sheet lamination direction D is the horizontal direction, and thereby the reinforced fiber base material 8 made of the plurality of fiber sheets 80 laminated together may be placed in the forming mold 2. Further alternatively, a plurality of sets of fiber sheets 80, in each of which the fiber sheets 80 are stacked and put together in their thickness direction, may be placed in the cavity forming portion 20b of the forming mold 2. It should be noted that the sheet lamination direction D is not strictly limited to the horizontal direction, but may be tilted to some extent from the horizontal direction (about) ±10°.

Next, the forming mold 2 is assembled (step S2). Here, the upper mold is combined with, and fixed to, the lower mold of the forming mold 2. Then, the forming mold 2 thus assembled is subjected to mold clamping by the mold clamping device (step S3). In this manner, the cavity 20 is formed inside the forming mold 2.

Subsequently, pressure in the sheet lamination direction D is applied to the reinforced fiber base material 8 placed in the cavity 20 by the pressing device 5 (step S4). Here, the pressure in the sheet lamination direction D is applied to the reinforced fiber base material 8 such that a desirable volume fraction of fiber (Vf) at injection is achieved. It should be noted that the volume fraction of fiber (Vf) at injection is adjusted (to 50 to 55%, for example) so that penetration of the resin 4 into the reinforced fiber base material 8 will not be hindered.

Next, gas is exhausted from the cavity 20. Here, the cavity 20 is substantially vacuated (step S5). At the time, all the injection ports 21 are closed, and each discharge port 22 is brought into connection with the exhauster 6. The exhauster 6 operates, and thereby the cavity 20 is subjected to vacuum drawing (i.e., forcible gas exhaustion from the cavity 20) until the cavity 20 is substantially vacuated. By vacuating the cavity 20 in this manner, air mixed into the resin 4 can be reduced.

Then, while performing the vacuum drawing of the cavity 20, the resin 4 is injected into the cavity 20 in the anti-gravitational direction to impregnate the resin 4 into the reinforced fiber base material 8 (step S6). Here, each discharge port 22 is in connection with the exhauster 6, and the cavity 20 is still being subjected to the vacuum drawing. Also, the injection ports 21 are opened, and the molten resin in the container 45 is injected into the cavity 20 by the injector 40.

The resin 4 is injected from the injection ports 21 into the cavity 20 in the anti-gravitational direction. That is, the injection direction of the resin 4 is parallel to the in-plane direction of each fiber sheet 80 of the reinforced fiber base material 8. For this reason, the penetration of the resin 4 is less likely to be hindered by the fiber sheets 80 of the reinforced fiber base material 8. Consequently, compared to a case where the injection direction of the resin 4 crosses the in-plane direction of each fiber sheet 80, the injection of the resin 4 can be done within a shorter period of time. Also, the direction in which the resin 4 penetrates into the reinforced fiber base material 8 is the anti-gravitational direction since the penetration of the resin 4 is less likely to be hindered by the fiber sheets 80. In addition, since the penetration direction of the resin 4 is the anti-gravitational direction, the rising liquid surface of the resin 4 is horizontal, and the penetration of the resin 4 is balanced between the inside of the fiber sheets 80 and the interlaminar gaps of the fiber sheets 80 although the inside of the fiber sheets 80 and the interlaminar gaps of the fiber sheets 80 have different flow resistances from each other.

When injecting the resin 4, during an initial period at the start of the injection (i.e., for a short period of time from the start of the injection), both ends of the liquid surface level 4L of the resin 4 penetrating into the reinforced fiber base material 8 are made higher than the center of the liquid surface level 4L as seen in the sheet lamination direction D. Thereafter, the injection of the resin 4 is controlled such that the liquid surface level 4L of the resin 4 is evened out. It should be noted that in the description and the claims herein, "end portions" of the reinforced fiber base material 8 in the sheet lamination direction D mean portions at both ends of the reinforced fiber base material 8 in the sheet lamination direction D, the portions accounting for up to 20% in the overall dimension of the reinforced fiber base material 8 in the sheet lamination direction D.

Figure 3:
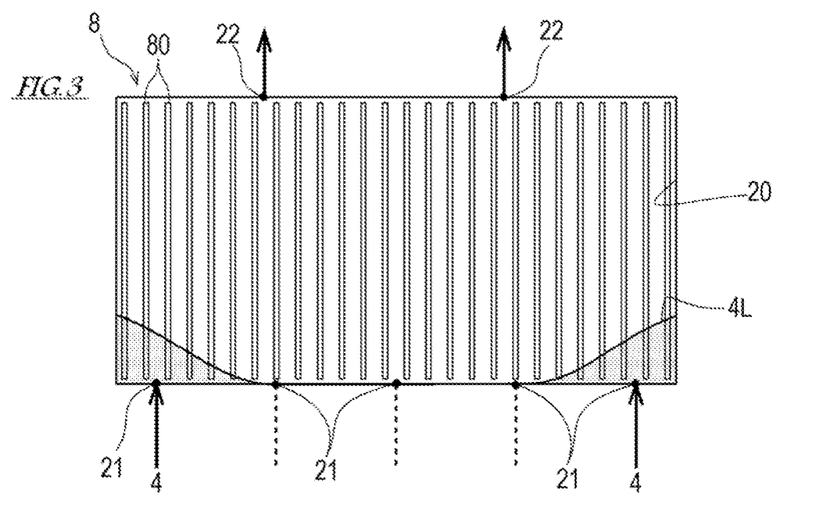
FIG. 3 illustrates a state where a resin penetrates into a reinforced fiber base material during an initial period at the start of resin injection.
Figure 4:
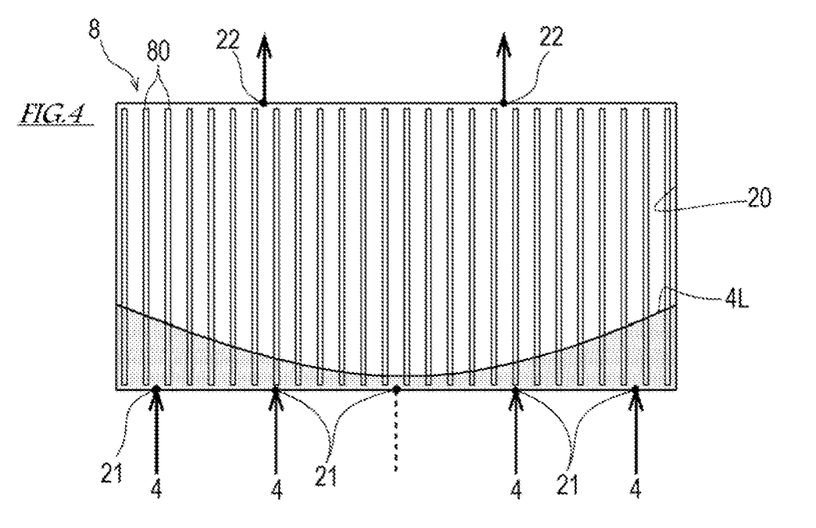
FIG. 4 illustrates a state, following the state shown in FIG. 3, where the resin penetrates into the reinforced fiber base material during the initial period at the start of the resin injection.

Specifically, as shown in FIG. 3, first, the injection ports 21 positioned below both the end portions of the reinforced fiber base material 8 in the sheet lamination direction D are opened. Next, as shown in FIG. 4, the injection ports 21 positioned closer to the central portion of the reinforced fiber base material 8 in the sheet lamination direction D than the previously opened injection ports 21 are opened. Here, the amounts of resin 4 injected from the respective injection ports 21 are equal to each other.

As a result, during the initial period at the start of the injection shown in FIG. 3 and FIG. 4, the liquid surface level 4L of the penetrating resin 4 is higher at both the end portions of the reinforced fiber base material 8 in the sheet lamination direction D than at the central portion of the reinforced fiber base material 8 in the sheet lamination direction D. Here, the height of the liquid surface level 4L of the resin 4 penetrating into the reinforced fiber base material 8 gradually increases from the central portion toward both the end portions of the reinforced fiber base material 8 in the sheet lamination direction D. That is, the fiber sheets 80 in both the end portions of the reinforced fiber base material 8 in the sheet lamination direction D receive greater pressure than the fiber sheets 80 in the central portion of the reinforced fiber base material 8 in the sheet lamination direction D. Such pressure difference in the reinforced fiber base material 8 causes pushing force to be applied to the fiber sheets 80 toward the center in the sheet lamination direction D (i.e., force that compresses the reinforced fiber base material 8 in the sheet lamination direction D is exerted). As a result, widening of the interlaminar gaps between the fiber sheets 80 (i.e., disturbance in the arrangement of the fiber sheets 80) is suppressed.

Figure 5:
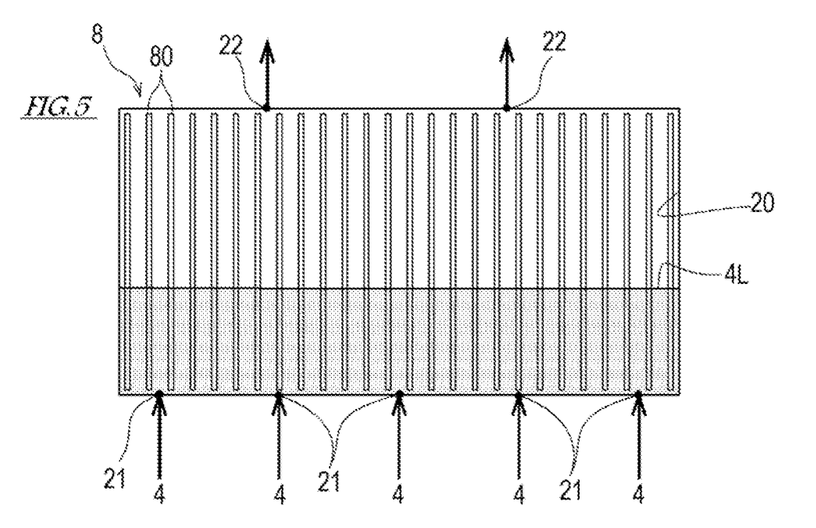
FIG. 5 illustrates a state, following the state shown in FIG. 4, where the resin penetrates into the reinforced fiber base material during the initial period at the start of the resin injection.

As described above, at an early stage of the injection of the resin 4, the height of the liquid surface level 4L of the resin 4 is varied among positions in the sheet lamination direction D, and then, the injection amount of the resin 4 is changed at, at least, one of the injection ports 21 such that the liquid surface level 4L of the resin 4 is evened out. Here, as shown in FIG. 5, the injection ports 21 positioned below the central portion of the reinforced fiber base material 8 in the sheet lamination direction D are opened, and thereby the injection amount from these injection ports 21 is increased. In this manner, uniform penetration of the resin 4 into the reinforced fiber base material 8 is facilitated. In the present embodiment, as shown in FIGS. 3 to 5 in a phased manner, the port opening timing is shifted among the injection ports 21, and thereby the pressure difference is caused in the reinforced fiber base material 8 in the sheet lamination direction D. The pressure difference is reduced gradually. It should be noted that a time from when the injection ports 21 are opened first to when all the injection ports 21 are opened is, for example, about 3 to 5 minutes although the length of the time depends on factors such as the volume and shape of the cavity 20 and the injection amount of the resin 4.

It should be noted that the port opening timing is not necessarily shifted among the injection ports 21. Alternatively, at the early stage of the injection of the resin 4, all the injection ports 21 may be opened concurrently. Here, the injection amount from the injection ports 21 positioned below the central portion of the reinforced fiber base material 8 in the sheet lamination direction D may be set to be less than the injection amount from the injection ports 21 positioned below both the end portions of the reinforced fiber base material 8 in the sheet lamination direction D. Also in this manner, the same pressure difference as that described above can be caused in the reinforced fiber base material 8.

Thereafter, when all the discharge ports 22 overflow with the resin 4, it is determined that the cavity 20 has been filled with the resin 4, and the injection of the resin 4 is ended (step S7). Specifically, all the injection ports 21 are closed by the open/close devices 42.

Subsequently, pressurized gas is supplied to the discharge ports 22 (step S8). Here, the switching device 44 switches the state of each discharge port 22 to the state of being connected to the air supply device 7. Then, the air supply device 7 supplies the discharge ports 22 with gas (air) whose pressure is higher than the pressure of the resin 4. As a result, the flow of the resin 4 from the injection ports 21 toward the discharge ports 22 is stopped, and also, the resin 4 filling the cavity 20 is pressurized. Consequently, air bubbles present in the resin 4 and the reinforced fiber base material 8 are reduced.

Next, pressure in the sheet lamination direction D is applied to the resin 4 filling the cavity 20 and to the reinforced fiber base material 8 (step S9). Here, the pressing device 5 applies the pressure to the resin 4 and the reinforced fiber base material 8 from both sides in the sheet lamination direction D to achieve the volume fraction of fiber (Vf) required for the FRP molded article. That is, in this step, the volume fraction of fiber (Vf) of the FRP molded article can be adjusted. Moreover, since the pressure is applied to the resin 4 and the reinforced fiber base material 8 from both sides in the sheet lamination direction D, disturbance in the arrangement of the fiber sheets 80 in the reinforced fiber base material 8 and widening of the interlaminar gaps between the fiber sheets 80 can be eliminated.

After the resin 4 is sufficiently impregnated into the reinforced fiber base material 8, the resin 4 is cured under the condition of being heated by the heater 3 or at an ordinary temperature while pressure in the sheet lamination direction D is being applied to the reinforced fiber base material 8 impregnated with the resin 4 (step S10). It should be noted that the timing of starting applying the pressure in the sheet lamination direction D to the reinforced fiber base material 8 impregnated with the resin 4 may be either before the start of the curing process of the resin 4 or within a period from when the curing process of the resin 4 is started until the resin 4 is cured. At last, after the resin 4 is cured, the FRP molded article made of the resin 4 and the reinforced fiber base material 8 is removed from the forming mold 2 (step S11). Through these steps, the FRP molded article can be produced.

As described above, the FRP molded article producing method according to the present embodiment includes the steps of: placing the reinforced fiber base material 8 made of the plurality of fiber sheets 80 laminated together in the cavity 20 of the forming mold 2, such that the sheet lamination direction D is the horizontal direction (step S1); impregnating the resin 4 into the reinforced fiber base material 8 by injecting the resin 4 into the cavity 20 in the anti-gravitational direction (step S6); applying pressure in the sheet lamination direction D to the reinforced fiber base material 8 impregnated with the resin 4 (step S9); and curing the resin 4 impregnated in the reinforced fiber base material 8 while keeping applying the pressure in the sheet lamination direction D to the reinforced fiber base material 8 (step S10).

In the above-described FRP molded article producing method, the sheet lamination direction D of the reinforced fiber base material 8 is the horizontal direction, and the injection direction of the resin 4 is the anti-gravitational direction. For these reasons, the penetration of the resin 4 into the reinforced fiber base material 8 is facilitated, and the liquid surface of the penetrating resin 4 is evened out. Therefore, uniform impregnation of resin 4 into the reinforced fiber base material 8 is facilitated. Meanwhile, there is a concern about widening of the interlaminar gaps between the fiber sheets 80 and disturbance in the arrangement of the fiber sheets 80.

In this respect, according to the above-described producing method, after the resin injection is ended and before the curing of the resin is completed, the reinforced fiber base material 8 impregnated with the resin 4 is compressed in the sheet lamination direction D by using the pressing device 5, which is capable of pressing the reinforced fiber base material 8 in the cavity 20 at any intended timing. Accordingly, an effect of suppressing disturbance in the arrangement of the fiber sheets 80 and suppressing widening of the interlaminar gaps between the fiber sheets 80 can be expected in the FRP molded article.

In the FRP molded article producing method according to the present embodiment, in the step of impregnating the resin 4 into the reinforced fiber base material 8 (step S6), during the initial period at the start of the injection of the resin 4 into the cavity 20, the amount of resin 4 injected from the injection ports 21 provided below both the end portions of the reinforced fiber base material 8 in the sheet lamination direction D is set to be greater than the amount of resin 4 injected from the injection ports 21 provided below the central portion of the reinforced fiber base material 8 in the sheet lamination direction D, such that the liquid surface level 4L of the resin 4 penetrating into the reinforced fiber base material 8 is higher at both the end portions of the reinforced fiber base material 8 in the sheet lamination direction D than at the central portion of the reinforced fiber base material 8 in the sheet lamination direction D, and thereafter, the injection amount of the resin 4 is changed at, at least, one of the injection ports 21 such that the liquid surface level 4L of the resin 4 is evened out.

As one example, in the above-described embodiment, during the initial period at the start of the injection of the resin 4, among the plurality of injection ports 21, after the injection of the resin 4 from the injection ports 21 provided below both the end portions of the reinforced fiber base material 8 in the sheet lamination direction D has been started, the injection of the resin 4 from the remaining injection ports 21 is started.

As described above, during the initial period at the start of the injection of the resin 4, the liquid surface level 4L of the resin 4 penetrating into the reinforced fiber base material 8 is made higher at both the end portions of the reinforced fiber base material 8 in the sheet lamination direction D than at the central portion of the reinforced fiber base material 8 in the sheet lamination direction D. As a result, both the end portions of the reinforced fiber base material 8 in the sheet lamination direction D receive greater pressure from the resin 4 penetrating into the reinforced fiber base material 8 than the central portion of the reinforced fiber base material 8 in the sheet lamination direction D. Such pressure difference generates force applied to the reinforced fiber base material 8, and the force is applied from both the end portions toward the central portion of the reinforced fiber base material 8 in the sheet lamination direction D. As a result, disturbance in the arrangement of the fiber sheets 80 and widening of the interlaminar gaps between the fiber sheets 80 due to the injection of the resin 4 are expected to be suppressed. In addition, since the disturbance in the arrangement of the fiber sheets 80 and the widening of the interlaminar gaps between the fiber sheets 80 are suppressed in the process of the resin 4 penetrating into the reinforced fiber base material 8, the penetration of the resin 4 is less likely to be hindered, and a difference in terms of the degree of penetration of the resin 4 is less likely to occur among different portions of the reinforced fiber base material 8. For these reasons, improvement in impregnation (penetration) uniformity of the resin 4 can be expected. If the uniformity in the impregnation of the resin 4 into the reinforced fiber base material 8 is improved, the formation of a void due to, for example, part of the resin 4 flowing ahead of the remaining resin 4 is suppressed.

Thus, according to the FRP molded article producing method of the present embodiment, even when the method is applied to the production of a thick FRP molded article having a great thickness in the sheet lamination direction D, the resin can be uniformly impregnated into the reinforced fiber base material, and also, disturbance in the arrangement of the fiber sheets 80 forming the reinforced fiber base material and widening of the interlaminar gaps between the fiber sheets 80 can be suppressed. Therefore, the above-described producing method makes it possible to produce a thick FRP molded article whose reinforced fiber base material is uniformly impregnated with the resin.

EXAMPLES AND COMPARATIVE EXAMPLES

Hereinafter, Examples 1 and 2 for verifying the usefulness of the FRP molded article producing method according to the present invention, and Comparative Examples 1 to 3 to be compared with Examples 1 and 2, are described.

Example 1

Fiber sheets, each being made of E glass fiber NCF (Non-Crimped Fiber) and having a size of 400 mm×75 mm, were laminated together, which was used as a reinforced fiber base material. Epoxy resin was used as a resin (matrix). The epoxy resin used in Example 1 was obtained by pre-mixing a liquid base-agent component and a liquid curing-agent component together.

An FRP molded article was obtained by performing steps S1 to S11 described below (these steps correspond to steps S1 to S11 described in the above embodiment).

Step S1: The reinforced fiber base material was placed in a forming mold such that the sheet lamination direction was the horizontal direction.

Steps S2, S3: The forming mold was assembled and subjected to mold clamping.

Step S4: Pressure was applied to the reinforced fiber base material from both sides in the sheet lamination direction, such that the volume fraction of fiber (Vf) at injection was adjusted to 55%.

Step S5: Gas was forcibly exhausted from the cavity until the cavity is vacuated.

Step S6: While performing the vacuum drawing of the cavity, the resin was injected in the anti-gravitational direction into the cavity from the bottom of the cavity. During an initial period at the start of the injection of the resin, through injection port opening/closing operations, first, the injection ports positioned below both the end portions of the reinforced fiber base material in the sheet lamination direction were opened; then, the injection ports positioned closer to the central portion of the reinforced fiber base material in the sheet lamination direction than the previously opened injection ports were opened; and thereafter, the remaining injection ports were opened. The volume ratio of the amount of resin injected from the injection ports opened first to the amount of resin injected from all the injection ports was 3:10.

Steps S7, S8: The injection of the resin was ended after the cavity was confirmed to have been filled with the resin, and the forcible gas exhaustion was switched to supplying of pressurized gas.

Step S9: Pressure from both sides in the sheet lamination direction was applied to the reinforced fiber base material impregnated with the resin to achieve a volume fraction of fiber (Vf) of 60%.

Step S10: While the pressure from both sides in the sheet lamination direction was being applied to the reinforced fiber base material impregnated with the resin, the resin was subjected to thermal curing in the forming mold.

Step S11: After the curing was completed, the forming mold was cooled, and the FRP molded article was removed from the forming mold.

The FRP molded article obtained by performing the above-described steps S1 to S11 was defined as the FRP molded article according to Example 1. The dimensions of the FRP molded article according to Example 1 were 400 mm×75 mm×T600 mm (the thickness in the sheet lamination direction). The time required for the resin impregnation was about 30 minutes.

Example 2

An FRP molded article according to Example 2 was obtained by performing the same steps as those of the above-described Example 1 except that, in step S6, unlike Example 1, all the injection ports were opened concurrently when the injection of the resin into the cavity was started.

Comparative Example 1

An FRP molded article according to Comparative Example 1 was obtained by performing the same steps as those of the above-described Example 1, except that step S9 of Example 1 was omitted in Comparative Example 1. It should be noted that since step S9 was omitted, the dimensions of the FRP molded article according to Comparative Example 1 were 400 mm×75 mm×T650 mm (the thickness in the sheet lamination direction), and the volume fraction of fiber (Vf) was 55%.

Comparative Example 2

An FRP molded article according to Comparative Example 2 was obtained by performing the same steps as those of the above-described Example 1 except that, in step S6, unlike Example 1, all the injection ports were opened concurrently when the injection of the resin into the cavity was started, and also, step S9 of Example 1 was omitted in Comparative Example 2. It should be noted that since step S9 was omitted, the dimensions of the FRP molded article according to Comparative Example 2 were 400 mm×75 mm×T650 mm (the thickness in the sheet lamination direction), and the volume fraction of fiber (Vf) was 55%.

Comparative Example 3

In Comparative Example 3, steps S1 to S5 of the above-described Example 1 were performed, and then in step S6, all the injection ports were opened concurrently when the injection of the resin into the cavity was started. Here, the resin was injected in the gravitational direction. In Comparative Example 3, since the penetration of the resin was hindered by the reinforced fiber base material, the resin injection required an excessive amount of time, and during step S6, excessive increase in the injection pressure occurred due to curing of the resin. For this reason, molding was terminated.

For each of the FRP molded articles according to Examples 1 and 2 and Comparative Examples 1 and 2, resin impregnation uniformity was evaluated, and presence of cracks and disturbance in sheet arrangement were checked by visual observation. Regarding the FRP molded articles according to Examples 1 and 2 and Comparative Examples 1 to 3, Table 1 shows production conditions, results of the evaluation of resin impregnation uniformity, and results of the observation of presence of cracks and disturbance in sheet arrangement.

TABLE 1

| Molding Conditions | | EX. 1. | EX. 2 | Comp. EX. 1 | Comp. EX. 2 | Comp. EX. 3 |
| --- | --- | --- | --- | --- | --- | --- |
| Fiber sheet arrangement | Fiber | E glass | E glass | E glass | E glass | E glass |
| | Arrangement direction | Horizontal direction | Horizontal direction | Horizontal direction | Horizontal direction | Gravitational direction |
| | Vf at injection | 55% | 55% | 55% | 55% | 55% |
| Resin injection method | Matrix resin | Epoxy resin | Epoxy resin | Epoxy resin | Epoxy resin | Epoxy resin |
| | Forming mold temperature | 60° C. | 60° C. | 60° C. | 60° C. | 60° C. |
| | Resin injection direction | Anti-gravitational direction | Anti-gravitational direction | Anti-gravitational direction | Anti-gravitational direction | Gravitational direction |
| | Injection port operation | End portion ports → All ports | All ports | End portion ports → All ports | All ports | All ports |
| | Flow ratio (End portion ports:All ports) | 3:10 | — | 3:10 | — | — |

TABLE 1-continued

| Molding Conditions | | EX. 1. | EX. 2 | Comp. EX. 1 | Comp. EX. 2 | Comp. EX. 3 |
|---|---|---|---|---|---|---|
| | Injection completion time | 30 minutes | 30 minutes | 30 minutes | 30 minutes | Not completed |
| | Impregnation uniformity | AA | A | AA | B | — |
| Curing | Pressure in sheet lamination direction | Applied | Applied | Not applied | Not applied | — |
| | Vf | 60% | 60% | 55% | 55% | — |
| FRP molded article | Thickness | 600 mm | 600 mm | 650 mm | 650 mm | — |
| | Cracks | Absent | Absent | Absent | Present | — |
| | Widening between sheets | Not occured | Not occured | Not occured | Occurred | — |
| | Sheets exhibiting serpentine shape | Absent | Absent | Present | Present | — |

As shown in Table 1, in the FRP molded articles according to Examples 1 and 2 and Comparative Example 1, neither formation of cracks nor widening of the interlaminar gaps between the fiber sheets occurred. On the other hand, in the FRP molded article according to Comparative Example 2, widening of the interlaminar gaps between the fiber sheets occurred in the central portion of the FRP molded article in the sheet lamination direction, and cracks originating from the widened gaps were formed.

In the FRP molded articles according to Examples 1 and 2, the fiber sheets exhibited no serpentine shape (no waviness). On the other hand, in the FRP molded article according to Comparative Example 1, the fiber sheets exhibited a serpentine shape in the central portion of the FRP molded article in the sheet lamination direction. Also, in the FRP molded article according to Comparative Example 2, the fiber sheets exhibited a serpentine shape over the entire sheet lamination direction.

The resin impregnation uniformity was evaluated based on deviation of an injection time of each discharge port from an average injection time in the step of impregnating the resin into the reinforced fiber base material (step S6). The "injection time" of each discharge port means a time from when the first injection port was opened to when the resin reached the discharge port. The "average injection time" is an average value of the injection times of all the discharge ports. For each discharge port, a "uniformity evaluation value" was calculated by using an equation shown below.

Uniformity evaluation value=(average injection time−injection time)/(average injection time)×100[%]

From among the uniformity evaluation values of all the discharge ports, one having the greatest absolute value was taken as "the greatest absolute value of the uniformity evaluation value". When the greatest absolute value of the uniformity evaluation value was in a range from 0 to 10%, it was evaluated that "the resin impregnation uniformity was significantly good (AA)". When the greatest absolute value of the uniformity evaluation value was greater than 10% but not greater than 20%, it was evaluated that "the resin impregnation uniformity was good (A)". When the greatest absolute value of the uniformity evaluation value was greater than 20%, it was evaluated that "the resin impregnation uniformity was poor (B)".

In the FRP molded articles according to Example 1 and Comparative Example 1, the resin impregnation uniformity was significantly good (AA). In the FRP molded article according to Comparative Example 2, the resin impregnation uniformity was good (A). On the other hand, in the FRP molded article according to Comparative Example 2, the resin impregnation uniformity was poor (B). According to these evaluation results, in the step of impregnating the resin into the reinforced fiber base material (step S6), even if all the injection ports are opened concurrently when the injection of the resin into the cavity is started, good resin impregnation uniformity is still obtained. However, at the start of the resin injection into the cavity, by shifting the port opening timing among the injection ports in accordance with the sheet lamination direction of the reinforced fiber base material, even better resin impregnation uniformity can be obtained. It should be noted that, in the step of impregnating the resin into the reinforced fiber base material (step S6), even if the injection start timing is not shifted among the injection ports, allowable resin impregnation uniformity is still obtained as in Comparative Example 2. In a case where the injection start timing is not shifted among the injection ports, instead of arranging the plurality of injection ports such that the injection ports are scattered in the sheet lamination direction, a slit-shaped injection port that is long in the sheet lamination direction may be provided. It is considered that allowable resin impregnation uniformity can be obtained even if the resin is injected from this slit-shaped injection port.

From the above evaluations and observation results, it is understood that the FRP molded article producing method according to the present invention makes it possible to produce a thick FRP molded article whose dimension in the sheet lamination direction is 600 mm far exceeding 100 mm, the production of which has been difficult with conventional RTM technique. According to the producing method of the present invention, the resin impregnation process (step S6) needs to be performed only once, and if the volume of the FRP molded article to obtain is about 400×75×600 mm, only about 30 minutes is required as the resin injection time. Thus, the FRP molded article producing method according to the present invention makes it possible to increase the mass productivity of FRP products.

REFERENCE SIGNS LIST 1 molding apparatus
2 forming mold
3 heater
5 pressing device
6 exhauster
7 air supply device
8 reinforced fiber base material
20 cavity 20a cavity forming portion
20b cavity forming portion
21 injection port
22 discharge port
40 injector
41 supply pipe
42 open/close device
43 exhaust gas pipe
44 switching device
45 container
80 fiber sheet
D sheet lamination direction

The invention claimed is:

1. A method of producing a fiber reinforced plastic molded article, the method comprising:
placing a reinforced fiber base material made of a plurality of fiber sheets laminated together in a cavity of a forming mold such that a sheet lamination direction is a horizontal direction, the sheet lamination direction being a direction in which the plurality of fiber sheets are laminated together;
impregnating a resin into the reinforced fiber base material by injecting the resin into the cavity via a plurality of injection ports, the plurality of injection ports are provided in the bottom surface of the cavity such that the injection ports are below the reinforced fiber base material placed in the cavity, the plurality of injection ports are scattered with respect to the sheet lamination direction such that at least one injection port is provided below each end portion of the reinforced fiber base material with respect to the sheet lamination direction and at least one injection port is provided below a central portion of the reinforced fiber base material with respect to the sheet lamination direction, and the plurality of injection ports are configured to inject the resin into the cavity from the bottom surface of the cavity towards an anti-gravitational direction;
applying pressure in the sheet lamination direction to the reinforced fiber base material impregnated with the resin; and
curing the resin impregnated in the reinforced fiber base material while applying the pressure in the sheet lamination direction,
wherein during an initial period at a start of injection of the resin into the cavity, an amount of the resin injected from the injection ports provided below the end portions of the reinforced fiber base material is set to be greater than an amount of the resin injected from the at least one injection port provided below the central portion of the reinforced fiber base material such that a liquid surface level of the resin penetrating into the reinforced fiber base material in the anti-gravitational direction is higher at the end portions of the reinforced fiber base material than at the central portion of the reinforced fiber base material, and
wherein after the initial period, the amount of the resin injected from the plurality of injection ports is changed such that the liquid surface level of the resin penetrating into the reinforced fiber base material in the anti-gravitational direction is evened out along the end portions and the central portion of the reinforced fiber base material.

2. The method of producing a fiber reinforced plastic molded article according to claim 1, wherein the amount of the resin injected from the injection ports provided below the end portions of the reinforced fiber base material is set to be greater than the amount of the resin injected from the at least one injection port provided below the central portion of the reinforced fiber base material by delaying a start of the resin injection from the at least one injection port provided below the central portion of the reinforced fiber base material.

* * * * *